United States Patent Office 3,513,569
Patented May 26, 1970

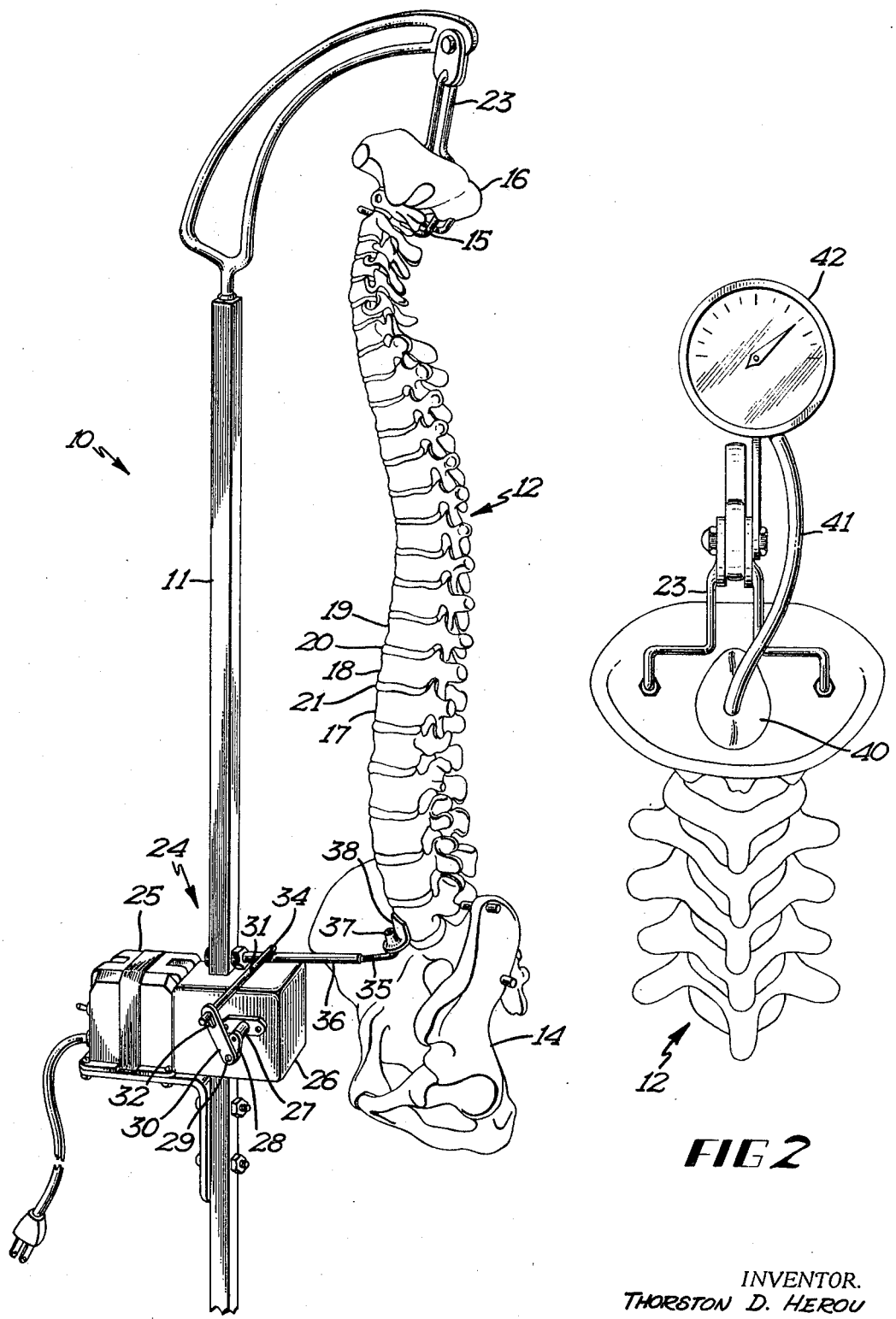

3,513,569
VERTEBRAE STRUCTURE
Thorston D. Herou, Milaca, Minn. 56353
Filed Dec. 29, 1967, Ser. No. 694,701
Int. Cl. G09b 23/32
U.S. Cl. 35—17     6 Claims

ABSTRACT OF THE DISCLOSURE

A mechanically actuated spine column or vertebrae structure including a skull base, atlas and a lower pelvic structure, the inter-vertebrae gaps or spaces being provided with a resilient pad for accommodating flexure between mutually adjacent vertebrae in the vertebrae column. The structure is normally disposed in an upright fashion, and motion is imparted to the structure at the lower lumbar zone by means of a reciprocatory rocking arm, the source of motion being coupled to the lower lumbar area at a point which is substantially at the normal center of gravity of the body. This coupling arrangement provides motion in the structure which substantially matches motion of ordinary walking.

---

The present invention relates to an inanimate vertebrae structure which is aranged to display the motion, action and reaction, and establishment of stresses in the vertebrae column of the human body. The structure includes an occiput or skull base, atlas and lower pelvic bones, these being separated by a vertebrae column, as in the case of the human body. Inter-vertebrae pads are disposed between mutually adjacent vertebrae, and these pads are resilient in nature in order to provide for a certain amount of relative motion including rocking motion between mutually adjacent vertebrae. Means are provided to retain the column in substantially upright fashion, for display purposes, and mechanical means are coupled to the structure in order to provide motion simulating certain body motions, such as that motion occurring during normal walking.

The center of motion of the pelvis is disposed at or substantially adjacent the center of gravity of the sacrum, and the motion accordingly rotates about the center of gravity of the body. The center of gravity of the body is normally located essentially at the anterior lower junction of the fifth lumbar with the sacrum and along the vertical center line of the gravity. Thus, with the axes of rotation disposed in predetermined fashion adjacent the center of gravity of the system, motion occurs which is substantially in accordance with that motion occurring during ordinary walking motion of the human. The mechanical motion is, in this case, a rocking oscillatory motion which is coupled to the approximately center of gravity of the body at the anterior inferior surface of the fifth lumbar vertebrae at the free end of a lever arm, the opposite end of the lever arm being coupled to a shaft capable of imparting oscillatory rotational motion to this free end. This structure finds particular utility as a teaching aid, and also has utility in other areas where a study or review of vertebrae motion is indicated.

It is a primary purpose of this invention to provide a mechanism to illustrate the relationship of motion and variations of internal pressures and stresses in the upper cervical region of the human spinal column, and to permit a relating of this motion in its entirety, particularly around the gravity line or axes of the column.

It is also a primary object of the present invention to provide an improved structure for illustrating the motion of a vertebrae column of the human body, the column being provided with an occiput or skull base, atlas and lower pelvic bones, along with a vertebrae column disposed therebetween, each of the inter-vertebrae spaces being provided with a resilient pad for responding to and accommodating oscillatory rotational or rocking motion which is mechanically coupled to the anterior inferior surface of the fifth lumbar vertebrae at a point substantially at the center of gravity of the body.

It is yet a further object of the present invention to provide an improved device for illustrating the action and reaction of a human vertebrae column when subjected to mechanical motion at a point substantially at the center of gravity of the sacrum, and at a point adjacent the center of gravity of the human body.

It is still a further object of the present invention to provide a mechanism to illustrate the relationship of motion of the human body as a whole around the gravity line, and to review the reaction which this motion initiates together with the variations of internal pressures established in the upper cervical region.

Other and further objects of the present invention will become apparent to those skilled in the art upon a study of the following specification, appended claims, and accompanying drawing wherein:

FIG. 1 is a perspective view of a model of a human vertebrae column coupled to a mechanical motion-producing system, the vertebrae column including an occiput or skull base, atlas and lower pelvic bones with an ordinary extended vertebrae column therebetween, the inter-vertebrae spaces or gaps being filled or otherwise provided with a resilient pad for permitting limited relative motion between mutually adjacent vertebrae; and FIG. 2 is a front elevational view of a system designed to illustrate changes in volume which occur along the vertebrae structure or in the upper cervical region during normal physical motion, such as, for example, walking or the like.

In accordance with the preferred modification of the present invention, and with particular attention being directed to FIG. 1, the model vertebrae system generally designated 10 includes a support column 11 and a model vertebrae structure shown generally at 12. The model vertebrae structure includes a lower pelvic member 14 along with an upper atlas as at 15 for supporting the skull base 16, a model vertebrae column being interposed between the lower pelvic member 14 and the upper atlas 15. The model column is composed of the usual or normal 24 vertebrae, such as are shown at 17, 18 and 19, these individual vertebrae being spaced apart by the usual inter-vertebrae pads, such as are shown at 20 and 21. These inter-vertebrae pads are, as indicated, somewhat resilient in order to accommodate a certain limited amount of relative motion between the individual members in the column, and are preferably fabricated from rubber or other flexible plastic. These pads have a consistency similar to firm rubber, with a Shore durometer of between about 30 and 50. The skull base member 16 is secured, as indicated, to the support hanger 23, and the pelvic portion is coupled to a source of mechanical motion, such as is shown generally at 24.

The mechanical motion is obtained by means of the output drive of motor 25, the output being coupled to the gear box 26, the gear box having an output shaft 27 extending therefrom, and provides for relatively slow rotational motion. Output shaft 27 is coupled to the arm 28 which has a pivot 29 coupled to the free end thereof, pivot 29 joining arm 30 to the system. Arm 30, therefore, is free to impart reciprocatory motion to the shaft 31 by virtue of the slot 32 formed in the free end of arm 30, slot 32 accommodating, as indicated, the free end of shaft 31. The opposite end of shaft 31, as at 34, is coupled to the drive shaft or rod 35 which is received and retained within the sleeve 36. The free end of rod 35 as at 37, is coupled to the approximate normal center of gravity of the body, as illustrated, ear member 38 being utilized to flexibly couple the rod end 37 thereto.

As is indicated, the offset portion 37 of the rod or shaft 35 is disposed at an acute angle to the main portion of the rod. It will be appreciated that various degrees of tilt may be employed, and for some purposes, the bent or upturned portion of the shaft may be at right angles to the main body or shank portion of the shaft. During the rocking or reciprocatory motion, the motion imparted to the spinal column is substantially analogous to that imparted to the spine and pelvis during normal walking by a human. In this connection, the disposition of the connection between the member 38 and the fifth lumbar vertebrae is such that the vertebrae column is caused to shift in response to this motion in a manner again, substantially analogous to that motion occurring during walking. The resilient inter-vertebrae pads such as the pads 20 and 21 are such as to accommodate this motion, again, substantially analogous to the motion occurring during walking.

The arrangement is such that various other motions can be applied to the structure in order to illustrate the action and reaction of the vertebrae column during this imparted motion. In each instance, the motion will normally be applied at the point as indicated in FIG. 1, since such applied motion is generally similar to the normal motion of the human body.

It is normally desirable that the linkage coupling the applied motion to the pelvis is of a type which permits reasonable distortion without introducing unusual stresses into the system at the juncture point between the motion inducing means and the bone structure. Thus, a loose or free-floating linkage is generally preferred. Therefore, any motion about the center of gravity of the body may be reviewed from its entire effect on the motion about the atlas area. The lateral masses of the atlas structure are generally wedge-shaped structures which permit the head to remain in a generally level or undisturbed disposition, while the mechanism disposed therebelow is in motion. In this connection, a rubber band is utilized to attach the skull base to the posterior ring of the atlas, the atlas being held in about the same horizontal plane as the skull. The main resilient supporting member is between the odontoid process of the axis and the base of the skull to permit rotational motion of the body around the gravity line. This rotational motion includes the tip of the odontoid, and since the center of motion of the axis is the center of the spinal canal, the odontoid process is forced together with the lateral masses or wedges of the atlas lateral, thus leaving the skull level and occupying the same general position in space. This force therefore must move around the arc determined by the condyles of the occiput, the center of this arc being found within the head.

As indicated herein, the center of gravity of the body is generally at the anterior inferior edge of the body of the fifth lumbar vertebrae. It is recognized, of course, that various conditions may be involved to cause this center of gravity point to shift. These considerations involve hereditary characteristics and acquired abnormalities, as well as any anomalous characteristic. In addition, certain authorities believe that the fifth lumbar is a portion of the pelvis, inasmuch as in certain instances, it follows the motion of the pelvis. Actually, the greatest motion occurs between the fourth and the fifth lumbar vertebrae, which event appears to indicate that the center of gravity of the body could actually be located at the lower or inferior anterior edge of the fourth lumbar vertebrae. However, the mechanism of the present invention is deigned to function on the basis that the motion is imparted at a point adjacent to the center of gravity.

With particular attention now being directed to FIG. 2 of the drawing, the structure including the vertebrae system 12 is provided with an inflatable bladder member 40 which is coupled to a tube, generally rigid in form, such as is shown at 41. The tube is then coupled to a pressure gauge 42 which is utilized to indicate any change in volume or compression of the upper cervical region. Thus, this arrangement is one which will illustrate pressure variations within this upper cervical region of the model as the spine or spinal column moves around the center of gravity of the body. The strain established for various motions is accordingly capable or susceptible of evaluation.

It is to be understood that the specific examples given herein are for purposes of illustration only, and that those skillled in the art may depart from these specific embodiments alone without necessarily departing from the spirit and scope of the present invention.

I claim:
1. A model vertebrae structure comprising:
  (a) a lower pelvic bone structure and a skull base and upper atlas spaced apart by a vertebrae column, said vertebrae column comprising a plurality of vertebrae spaced apart with a resilient pad member disposed therebetween;
  (b) means for supporting said vertebrae structure in a generally upright disposition; and
  (c) mechanical means coupled to the said model vertebrae structure for imparting repeated rhythmic motion thereto, said mechanical means being coupled generally to the fifth lumbar vertebrae at the intersection of the projection of the vertical axis of said vertebrae column and the center of gravity of the body.

2. The model vertebrae structure as defined in claim 1 being particularly characterized in that said mechanical means provides reciprocatory arcuate motion generally about the center of gravity of the vertebrae column.

3. The model vertebrae structure as defined in claim 1 being particularly characterized in that said mechanical means is coupled to the center of gravity with a flexible linkage providing rocking reciprocatory motion to said lumbar vertebrae, said linkage including a shaft disposed generally normal to said fifth lumbar having means for rocking about the axis thereof, and said shaft terminating in a leg so as to provide an L-shaped member with said leg being recevied in an inverted cup member attached directly to said fifth lumbar vertebrae.

4. The model vertebrae structure as set forth in claim 1 being particularly characterized in that said resilient pads are fabricated from rubber having a Shore durometer of from between about 30 and 50.

5. The model vertebrae structure as set forth in claim 1 being particularly characterized in that a skull base is attached to the atlas, the atlas being supported by said supporting structure for movement about the vertical axis of the vertebrae column.

6. The model vertebrae structure as set forth in claim 1 being particularly characterized in that means are provided for detecting stresses established in the vertical column from motion imparted thereto, said detecting means including an inflatable cylindrical column fabricated from resilient material and forming an enclosure and having pressure responsive gauge means secured to one end thereof, said inflatable column being inserted into said vertebrae column so as to respond with a change in internal pressure upon a change in axial disposition of said vertebrae column.

References Cited
UNITED STATES PATENTS

| | | | |
|---|---|---|---|
| 839,267 | 12/1906 | Bunker | 35—17 X |
| 979,147 | 12/1910 | Fryette | 35—17 |
| 1,581,736 | 4/1926 | Hassler | 35—17 |
| 2,021,566 | 11/1935 | Millard | 35—17 |
| 2,537,573 | 1/1951 | Conschafter | 35—17 |

EUGENE R. CAPOZIO, Primary Examiner

H. S. SKOGQUIST, Assistant Examiner